United States Patent
Harris

(10) Patent No.: US 7,490,348 B1
(45) Date of Patent: Feb. 10, 2009

(54) WIRELESS NETWORK HAVING MULTIPLE COMMUNICATION ALLOWANCES

(75) Inventor: Scott C. Harris, Rancho Santa Fe, CA (US)

(73) Assignee: Harris Technology, LLC, Rancho Sante Fe, CA (US)

( * ) Notice: Subject to any disclaimer, the term of this patent is extended or adjusted under 35 U.S.C. 154(b) by 684 days.

(21) Appl. No.: 10/800,472

(22) Filed: Mar. 15, 2004

Related U.S. Application Data

(60) Provisional application No. 60/454,694, filed on Mar. 17, 2003.

(51) Int. Cl.
*H04L 29/00* (2006.01)

(52) U.S. Cl. .............. 726/4; 726/2; 726/14; 726/21; 726/27; 713/153; 713/155; 713/166; 725/29; 725/30

(58) Field of Classification Search .............. 726/3, 726/4, 5, 7, 14, 15, 17, 19, 21, 27, 2; 713/166, 713/153, 155; 709/203, 225; 725/29, 30
See application file for complete search history.

(56) References Cited

U.S. PATENT DOCUMENTS

| | | | | |
|---|---|---|---|---|
| 5,272,754 A * | 12/1993 | Boerbert | ............... | 713/159 |
| 6,044,349 A * | 3/2000 | Tolopka et al. | ............... | 705/1 |
| 6,119,945 A * | 9/2000 | Muller et al. | ............... | 235/492 |
| 6,181,684 B1 * | 1/2001 | Turcotte et al. | ............... | 370/332 |
| 6,240,455 B1 * | 5/2001 | Kamasaka et al. | ............... | 709/229 |
| 6,304,973 B1 * | 10/2001 | Williams | ............... | 726/3 |
| 6,332,163 B1 * | 12/2001 | Bowman-Amuah | ............... | 709/231 |
| 6,337,912 B2 * | 1/2002 | Buhr et al. | ............... | 380/279 |
| 6,356,937 B1 * | 3/2002 | Montville et al. | ............... | 709/206 |
| 6,463,338 B1 * | 10/2002 | Neet | ............... | 700/17 |
| 6,530,025 B1 * | 3/2003 | Nakagawa et al. | ............... | 726/4 |
| 6,606,659 B1 * | 8/2003 | Hegli et al. | ............... | 709/225 |
| 6,615,251 B1 * | 9/2003 | Klug et al. | ............... | 709/218 |
| 6,719,200 B1 * | 4/2004 | Wiebe | ............... | 235/382 |
| 6,934,841 B2 * | 8/2005 | Boyles et al. | ............... | 713/159 |
| 6,970,927 B1 * | 11/2005 | Stewart et al. | ............... | 709/225 |
| 7,062,750 B2 * | 6/2006 | Whidby et al. | ............... | 717/103 |
| 7,130,904 B2 * | 10/2006 | Kitchin | ............... | 709/225 |
| 7,286,848 B2 * | 10/2007 | Vireday et al. | ............... | 455/550.1 |
| 2002/0022483 A1 * | 2/2002 | Thompson et al. | ............... | 455/439 |
| 2002/0178365 A1 * | 11/2002 | Yamaguchi | ............... | 713/182 |
| 2002/0188589 A1 * | 12/2002 | Salmenkaita et al. | ............... | 707/1 |
| 2003/0004950 A1 * | 1/2003 | Wils et al. | ............... | 707/10 |
| 2003/0079120 A1 * | 4/2003 | Hearn et al. | ............... | 713/150 |
| 2003/0087649 A1 * | 5/2003 | Bhatia et al. | ............... | 455/456 |
| 2003/0177237 A1 * | 9/2003 | Stebbings | ............... | 709/225 |
| 2003/0231610 A1 * | 12/2003 | Haddad | ............... | 370/338 |
| 2004/0004965 A1 * | 1/2004 | Chen et al. | ............... | 370/395.2 |
| 2004/0073674 A1 * | 4/2004 | Vergnaud et al. | ............... | 709/226 |
| 2005/0086346 A1 * | 4/2005 | Meyer | ............... | 709/229 |

* cited by examiner

*Primary Examiner*—Carl Colin

(57) ABSTRACT

Multiple levels of wireless network resource granting. A user who has an authorized key, e.g., an encryption key or a key indicating that they have paid for service, gets a first, better level of access to the network resources. One without the key is granted lesser access, e.g., less total bandwidth, less bandwidth speed, no access to files or the like.

14 Claims, 1 Drawing Sheet

WIRELESS NETWORK HAVING MULTIPLE COMMUNICATION ALLOWANCES

This application claims priority to U.S. Provisional Ser. No. 60/454,694 filed Mar. 17, 2003.

FIELD OF INVENTION

Wireless networks are well-known, and may be based, for example, on the 802.11 standard. Because the contents of the wireless network can be received by anyone with wireless access, security may be achieved through encryption of the stream. Anyone with an encryption code can tap into the network. Those without the encryption code, however, simply cannot decode the wireless stream. In addition, standard network protocols may be used, so that not only the encryption code, but also a network login, is necessary.

SUMMARY

The present application describes a wireless network, defining a plurality of different classes of service, where the different classes of service include at least a first class of service that includes a first set of permissions for access to resources, and a second class of service which includes a second set of permissions of access to resources.

BRIEF DESCRIPTION OF THE DRAWINGS

These and other aspects will now be described in detail with reference to the accompanying drawings, in which.

DETAILED DESCRIPTION

Figure 1:
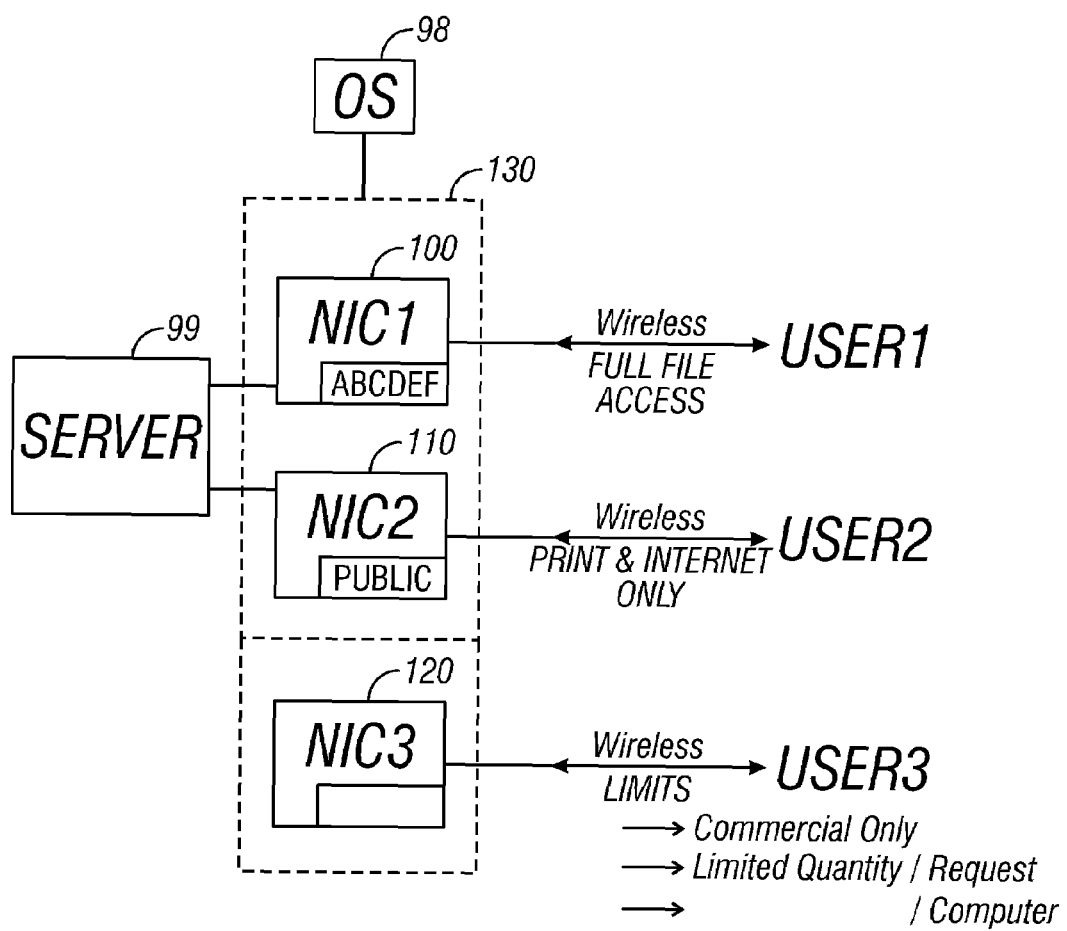
FIG. 1 shows a basic diagram of the networks described herein.

Wireless networks have been used for other things besides secure file transfer. For example, Internet Cafes, and "wireless hot spots" may include the capability of communication to a user's personal laptop which is equipped with a wireless card. This may use a network key for the encryption of the word "public", or a network key which is given to users who pay for the service or pay for a drink or food, or without any network key at all. Certain areas such as hotel rooms are often wireless enabled. However, the communication is typically or totally on, or totally off; that is either the user is allowed to receive wireless Internet, or the user is blocked from all communications.

The present system teaches a network with multiple levels of capability, depending on the access credentials possessed by the user. FIG. 1 shows this being carried out using multiple network cards or NICs. However, the same effect can be obtained with a single NIC. Preferably the network cards are wireless, using one of the features of IEEE 802.11 wireless communication protocols.

Different classes of users may be assigned. The first class of users, shown as user 1, are allowed file access to files and information from the server. These users may be given the encryption key, here for the first NIC 100 here shown as ABCDEF. These users may be allowed the highest level of access to resources. As conventional users who have the complete set of credentials, they are allowed unlimited upload and download, and full file access (that is allowed to non-administrator users). In addition, these users may be allowed the maximum upload and download speeds which is given to network users, and to receive all different kinds of Internet and files from all sources.

For example, the amount of access which is provided to these users may be assigned by the operating system which drives the NICS. For example, if Windows XP is used as the operating system, it may assign NIC 100 with unlimited file access.

A second class of users shown as user 2 do not have the credentials, here the encryption key, for the network card 100, and hence use the encryption key "public" and thereby can only communicate with the network card No. 2 shown as 110. Alternatively, these same users may communicate using no encryption key at all. The network card 110 allows only some subset of the operations that are allowed by the network card 100. For example, the user 2 may receive Internet only, and no file access. They may be allowed to print. In addition, the upload and download speeds may be limited or severely limited; for example, the Internet may be limited to 1M download speeds and 100K of upload speed.

This system as described above may be usable in an office environment. For example, users who are actually members of the office obtain file access, while visitors only receive print and Internet access.

Another contemplated use is in pay-for-Internet use. The user 1 may pay a higher fee than the user 2. For example, user 2 may pay only for limited Internet, while user 1 may pay for access to resources such as video over IP, and higher download speeds from the Internet.

In addition, a third class of users shown as user 3 may be defined. These users communicate only to NIC 120. Note that while this describes users 1, 2 and 3, any subset of these users may be used, for example a system may be configured which only communicates with user 1 and user 3. The NIC No. 3 is shown as having no encryption code whatsoever. User 3 is limited even further. User 3 may receive only commercial parts of the Internet. In the office environment, this may limit the Internet to web pages describing the office and/or certain intranet sites. In a pay for internet environment, this may describe the "free" user, who may only receive certain content. User 3 may also receive a severely restricted bandwidth and/or only a limited quantity of information. For example, the user 3 may be assigned a token which allows them only to receive for example total of 1 megabytes of download and only to upload 100 Kilobytes of upload. This even further limits the user 3.

As described above, the different users in their different classes have different levels of file access, and resource access, resource speed and resource amount.

FIG. 1 shows this being carried out with three different network cards over the same airspace. Alternatively, the three different networks may be carried out as part of a single network card; shown as network card 130. For example, this may include three network resources which operate on the single card. Alternatively, the three different kinds of resources may be carried out in software, for example this may be carried out by three different network resource allowances within the software that runs the network card or within the server 99.

Other implementations are within the disclosed embodiment

What is claimed is:

1. A wireless network, comprising:
   a first communication part defining a first class of service that includes a first set of permissions for access to resources including access to files on a system being controlled by said first communication part, and a second communication part, transmitting a separate communication stream from said first communication part, over substantially a same transmitting area as said first communication part, and said second communication part defining a second class of service which includes a second set of permissions of access to resources, where said second set of permissions does not include said access to said files on said system, said first communication part having its access controlled by requiring users of the first communication part to use a first key, said first key being a non-public key of a type that controls access, and automatically provides access to users that have said first key and does not provide access to users who do not have said first key, said second communication part allowing access without said first key;

wherein said second communication part allows said access upon detecting a second key which is a public key, and does not allow said access when not detecting said second key;

a third communication part, transmitting a separate communication stream from said first communication part, and separate from said second communication part, over substantially a same transmitting area as said first and second communication parts, and said third communication part defining a third class of service which includes a third set of permissions of access to resources, where said third set of permissions does not include said access to said files on said system, and allows access to only specified internet sites;

wherein said third communication part allowing access without needing any key.

2. A network as in claim 1, wherein said first class of service includes a greater speed of network access than said second class of service.

3. A network as in claim 1, wherein said wireless network includes an access granting mechanism, that detects a user's key, and automatically grants one of said first and second levels of services based on detecting one of said first or second key, or grants said third level of service if a user is detected without said first or second key.

4. A wireless network system, comprising:
a first wireless network portion, including a first network transmitter, which is accessed by users having a first key which is a non-public key of a type that controls access, and which allows a first specified level of access to services, and which automatically grants access to users having said first key but does not grant access to users who do not have said first key; and a second wireless network portion, including a second network transmitter transmitting over substantially the same area as said first network transmitter, which is accessed by users not having said first key, which allows a second specified level of access to services which includes less services than said first specified level of access to services;

wherein said second wireless network portion allows said access upon detecting a second key which is a public key, and does not allow said access when not detecting said second key;

a third wireless network portion, transmitting a separate communication stream from said first and second wireless network portions, and separate from said first and second wireless network portions, over substantially a same transmitting area as said first and second wireless network portions, and said third wireless network portions defining a third class of service which includes a third set of permissions of access to resources, where said third set of permissions does not include access to files on said system, and allows access to only specified internet sites, wherein said third communication part allowing access without needing any key.

5. A system as in claim 4, wherein said second specified level of access to services specifies an amount of bandwidth.

6. A system as in claim 4, wherein said second specified level of access to services specifies an amount of access to network files.

7. A system as in claim 4, wherein said first and second wireless network portions are separate wireless network interface cards operating in the same location.

8. A system as in claim 4, wherein said non-public key is an encryption key.

9. A method, comprising:
at a first location, first allowing a user to obtain access to wireless network resources which has a specified level of network features by using a first key which is a non-public encryption key, to access a first wireless network portion that has said first specified level of network features;

at said first location, second allowing a user to obtain access to only a first subset of said specified level of network features, less than said specified level of network features, and having a more limited download speed than said first wireless network, by accessing a second wireless network portion using a second key which is a public encryption key; and at said first location, third allowing a user to obtain access to only a second subset of specified internet sites, comprising less access than said first subset of said specified level of network features, by accessing a third wireless network portion, said third wireless network portion defining a third class of service;

wherein said third allowing allows access without needing any encryption key and wherein each of said first, second and third wireless network portions transmit a separate communication over substantially a same transmitting area as said first and second wireless network portions; and automatically granting said first allowing if a first encryption key is detected, automatically granting said second allowing if a second encryption key is detected, and automatically granting said third allowing if neither said first nor second encryption key is detected.

10. A method as in claim 9, wherein said second allowing allows said access upon detecting a second key, and does not allow said access when not detecting said second key.

11. A method as in claim 9, wherein said first allowing allows access to files, and said second allowing does not allow access to any files, but does allow access to Internet.

12. A method as in claim 9, further comprising detecting a user's network credential, and automatically granting one of said first allowing or said second allowing based on said credential.

13. A method as in claim 9, wherein said first non-public key comprises an indication that a user has paid for a certain specified service.

14. A method as in claim 9, wherein said second allowing allows internet access but only to certain web pages.

* * * * *